United States Patent
Favie et al.

(10) Patent No.: US 10,426,142 B2
(45) Date of Patent: Oct. 1, 2019

(54) POOL CLEANING APPARATUS WITH A FILTRATION DEVICE THAT CAN BE EXTRACTED VIA A LATERAL FACE

(71) Applicant: ZODIAC POOL CARE EUROPE, Bron (FR)

(72) Inventors: Louis Favie, Colomiers (FR); Philippe Blanc Tailleur, Toulouse (FR); Philippe Pichon, Villeneuve de Riviere (FR)

(73) Assignee: Zodiac Pool Care Europe, Bron (FR)

( * ) Notice: Subject to any disclaimer, the term of this patent is extended or adjusted under 35 U.S.C. 154(b) by 3 days.

(21) Appl. No.: 15/573,364

(22) PCT Filed: May 10, 2016

(86) PCT No.: PCT/FR2016/051096
§ 371 (c)(1),
(2) Date: Mar. 21, 2018

(87) PCT Pub. No.: WO2016/181065
PCT Pub. Date: Nov. 17, 2016

(65) Prior Publication Data
US 2018/0249685 A1     Sep. 6, 2018

(30) Foreign Application Priority Data

May 12, 2015    (FR) .................... 15 54277

(51) Int. Cl.
*E04H 4/16*    (2006.01)
*A01K 61/00*    (2017.01)

(52) U.S. Cl.
CPC ........... *A01K 61/00* (2013.01); *E04H 4/1654* (2013.01); *Y02A 40/81* (2018.01)

(58) Field of Classification Search
CPC ....... A01K 61/00; E04H 4/1654; Y02A 40/81
(Continued)

(56) References Cited

U.S. PATENT DOCUMENTS

| 2008/0099409 A1* | 5/2008 | Gorelik ................ E04H 4/1654 |
| | | 210/780 |
| 2017/0096828 A1 | 4/2017 | Moore et al. |

FOREIGN PATENT DOCUMENTS

| FR | 2925550 A1 | 6/2009 |
| FR | 2925558 A1 | 6/2009 |

(Continued)

OTHER PUBLICATIONS

Machine-generated English translation of FR 2990975, generated on Apr. 6, 2019.*

(Continued)

*Primary Examiner* — Fred Prince
(74) *Attorney, Agent, or Firm* — Kilpatrick Townsend & Stockton LLP; Dean W. Russell

(57) ABSTRACT

The invention concerns an apparatus for cleaning a surface immersed in a liquid, notably a swimming pool cleaning robot, including a body, said body including lower, upper and lateral walls configured so that said lower wall is intended to be positioned facing the immersed surface over which the apparatus (10) moves, said upper wall is opposite said lower wall, said lateral walls connect said lower and upper walls, means for moving the body (11) over said immersed surface. Said apparatus also includes a central chamber (15), situated inside the body (11), and including a filter basket (151), said filter basket (151) including a filter wall, and an opening (113) enabling extraction of said filter basket (151) from the body (11). Furthermore, said opening (113) is on a lateral wall of the body (11).

9 Claims, 3 Drawing Sheets

(58) Field of Classification Search
USPC .......... 210/167.16, 167.17, 232, 167.1, 238; 15/1.7
See application file for complete search history.

(56) References Cited

FOREIGN PATENT DOCUMENTS

| | | |
|---|---|---|
| FR | 2990975 A1 | 11/2013 |
| GB | 1565807 A | 4/1980 |
| IL | 187863 | 10/2012 |

OTHER PUBLICATIONS

International Patent Application No. PCT/FR2016/051096, International Search Report and Written Opinion, dated Jul. 21, 2016, 12 pages.
French Patent Application No. 1554277, Preliminary Report, dated Jan. 26, 2016, 8 pages.

* cited by examiner

POOL CLEANING APPARATUS WITH A FILTRATION DEVICE THAT CAN BE EXTRACTED VIA A LATERAL FACE

The present invention relates to the field of swimming pool apparatuses. It more particularly concerns a swimming pool cleaning apparatus the debris filter of which can be extracted from a lateral face of the body of the apparatus.

PRIOR ART

The invention concerns an apparatus for cleaning a surface immersed in a liquid, such as a surface formed by the bottom and the lateral walls of a pool, notably a swimming pool. To be more specific, the invention relates to a mobile swimming pool cleaning robot. Such a robot cleans the swimming pool by travelling over and brushing the surface of said pool and aspirating any debris toward a filter adapted to collect said debris. By debris is meant all the particles present in the pool and having an area or volume within a certain range the lower and upper limits of which depend on the technical characteristics of the robot, so that, on the one hand, the upper limit allows the entry of said particles into the filter device and, on the other hand, the lower limit prevents said particles leaving the filter device. It is a question, for example, of fragments of leaves, microalgae, etc., this debris normally being deposited on the bottom of the pool or stuck to the lateral walls thereof.

The robot is usually supplied with energy by an electrical cable connecting said robot to an external control and power supply unit.

At present there exist various apparatuses for cleaning immersed surfaces, notably with a filter device that can be demounted and extracted. Thus, it is known, in particular of the applicant's patent applications EP 2 235 293 and EP 2 235 296, apparatuses conventionally including a body, members for driving said body over the immersed surface, a filter chamber inside the body and having a liquid inlet, a liquid outlet, a hydraulic circuit for circulating liquid between the inlet and the outlet via a filter device. Moreover, in the cleaning apparatuses described in the above documents, the filter device can be removed and extracted from the body of the apparatus by means of a hatch on an upper wall of the body of said apparatuses so that the leaves and other debris can be emptied out without having to turn over the cleaning apparatus.

These apparatuses have automatic programs for cleaning the bottom of the pool and possibly the lateral walls thereof. Such a program determines a predetermined time for cleaning the swimming pool. The robot is generally removed from the water by the user at the end of the cycle or at regular intervals when the filter is no longer able to fulfil its functions because it is too full of debris (leaves, microparticles, etc.) and needs to be cleaned. In recent designs, the external control and power supply unit of the robot emits a luminous signal when this operation of cleaning the filter must be carried out.

The cleaning of the filter by the user requires the latter to remove the robot from the swimming pool to extract the filter accommodated inside its body, then to empty out the filter, and finally to wash it in copious amounts of water, for example using a hose. These operations potentially soil the user given the non-negligible risk of contact with the debris and filter sludge. These cleaning operations therefore constitute a source of discomfort for the user.

Moreover, the filtration performance of the apparatus also depends on the capacity of the hydraulic circuit and the geometry of the internal components for generating swirling movements of the liquid inside the filter device. In current designs of cleaning apparatus, the configuration and the position of the filter device with regard to the hydraulic circuit as a whole rule out optimizing the occurrence of such swirling movements. In fact, when it enters the filter device, the movement of the flow of liquid is stopped by various physical obstacles such as straight walls, thereby preventing the liquid from following its natural path and creating swirling movements.

Moreover, in current cleaning apparatuses, the arrangement of the filter device with regard to the hydraulic circuit imposes routing the liquid either alongside or over said filter device. Consequently, when it is operating, the cleaning apparatus is carrying a quantity of water very much greater than that actually contained in the filter device. This excess mass of liquid has a direct effect on the weight of the cleaning robot, making its extraction from the swimming pool difficult.

SUMMARY OF THE INVENTION

An objective of the present invention is to remedy some or all of these drawbacks of the prior art, notably those explained above, by proposing a solution that makes it possible to have swimming pool cleaning apparatus including a body and a filtration device arranged within said body, said filtration device being configured so as to promote the creation of swirling movements, to be easily cleanable by a user, and such that the total weight of water in said apparatus is optimized so as to facilitate its extraction from the swimming pool.

To this end, the invention concerns an apparatus for cleaning a surface immersed in a liquid, notably a swimming pool cleaning robot, including a body, said body including lower, upper and lateral walls configured so that:

said lower wall is intended to be positioned facing the immersed surface over which the apparatus moves, said upper wall is opposite said lower wall, said lateral walls connect said lower and upper walls, means for moving the body over said immersed surface, a central chamber, situated inside the body, and including a filter basket, said filter basket including a filter wall, and an opening enabling extraction of said filter basket from the body. Moreover, said opening is on a lateral wall of the body.

Thus, the respective configurations of the central chamber and its filter basket inside the body of the swimming pool robot advantageously make it possible to optimize the volume of water (or, as an equivalent, the weight of water) carried by said robot. Indeed, all of the water filtered by the robot passes, inside, through said central chamber, that is to say inside said robot. Consequently, the electrical power consumption of the robot necessary for operation is also optimized.

Moreover, since the opening which allows access to the filter basket is arranged on a lateral wall of the robot, this facilitates on one hand the extraction thereof, in order in particular to proceed with cleaning thereof. On the other hand, this makes it possible to advantageously design the robot with a hydraulic circuit such that the water that is to be filtered enters within the filter basket in a direction that is suitable for maintaining swirling movements (also referred to as "cyclonic" movements) within said filter basket, said swirling movements continuously unclogging the filter wall of the basket.

In particular embodiments, the cleaning apparatus has one or more of the following features, separately or in all technically possible combinations.

In one particular embodiment, said lateral walls include right and left lateral walls respectively positioned on the right and the left of the apparatus when said apparatus moves forward, said opening being of cylindrical shape and positioned on said right or left lateral wall.

The cylindrical shape of said opening makes it possible to design a filter chamber that is itself essentially cylindrical in shape so that the filter basket matches the shape of and occupies almost all the internal volume of said filter chamber. Thus, the volume of water contained inside the body of the robot is, for the great majority, located inside the filter chamber.

Moreover, the fact that the opening, the filter chamber and the filter basket are each cylindrical in shape advantageously makes it possible to design for the water to arrive within the filter basket so that the movement of the water as it arrives is tangential to the cylindrical wall of said basket. Thus, the water enters the basket following the curvature of the wall of the basket, which makes it easier for swirling movements of the water within the filter basket to occur and to be maintained.

Furthermore, the essentially cylindrical shape of the filter basket advantageously makes it possible for the water entering therein to be filtered there on the surface of its filter wall, said filter wall referring in this context to a peripheral wall.

In one particular embodiment, the filter basket includes a cover hermetically mounted on said filter basket.

In one particular embodiment, the filter basket has a cover mounted hermetically to the said filter basket.

The fact that the cover is hermetically mounted on the filter basket advantageously makes it possible for the water contained in said basket, when the robot is in operation in the swimming pool, to be unable to escape via said opening arranged on a lateral wall of said robot.

In one particular embodiment, the cover is removable from said filter basket.

In one particular embodiment, the cover includes holding means adapted to enable extraction of the filter basket from the body.

In this manner, grasping said holding means of the cover facilitates the extraction of the filter basket from the interior of the filter chamber, and thus from the robot.

In one particular embodiment, the cover includes means for locking it to the body adapted to prevent involuntary extraction of the filter basket.

In one particular embodiment, the filter wall of the filter basket (151) includes a filter lateral face (153) facing the cover (17).

Such a lateral filter face advantageously increases the total filtering surface of the filter basket, such that the water entering the interior of the basket is filtered not only through its peripheral surface but also through said lateral filter surface.

In one particular embodiment, the filter basket (151) includes holding means (23) on the filter lateral face (153).

Such a configuration of the filter basket advantageously makes it possible to improve grasping and manipulation of the filter basket during extraction and cleaning thereof. Indeed, coupled with the holding means of the cover, the holding means of the filter surface make it easier to grasp the basket such that it is possible to avoid all contact with the filter wall of said basket during cleaning operations carried out outside the swimming pool.

In one particular embodiment, the means for moving the body (11) comprise members (12) for driving and guiding the body (11).

DESCRIPTION OF THE FIGURES

The features and advantages of the invention will be better appreciated thanks to the following description, which describes the features of the invention through preferred embodiments which are in no way limiting on the invention.

The description relates to the appended figures in which.

In these figures, references that are identical from one figure to another designate identical or similar elements. For reasons of clarity, the elements are not represented to scale, unless otherwise indicated.

DETAILED DESCRIPTION OF ONE EMBODIMENT OF THE INVENTION

The present invention finds its place in a swimming pool technical environment, for example a family type swimming pool set into the ground. Such a swimming pool notably includes walls constituting an immersed surface.

Figure 1:
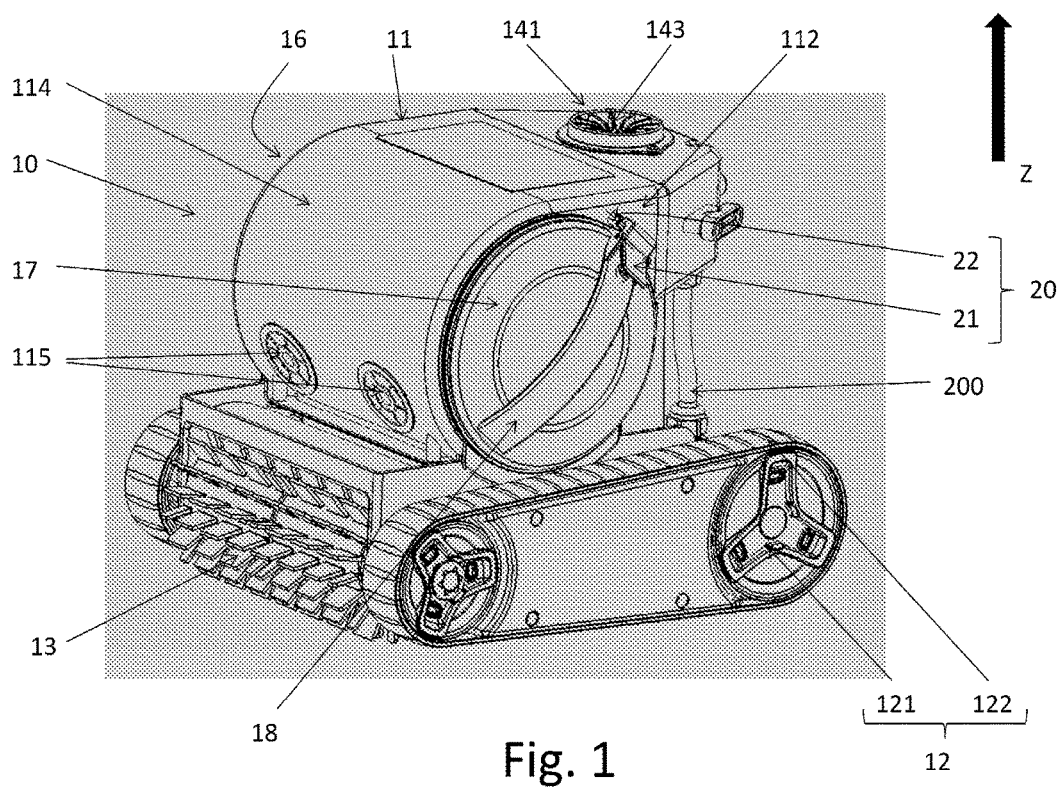
FIG. 1 is a ¾ front view of one embodiment of a swimming pool cleaning robot.
Figure 2:
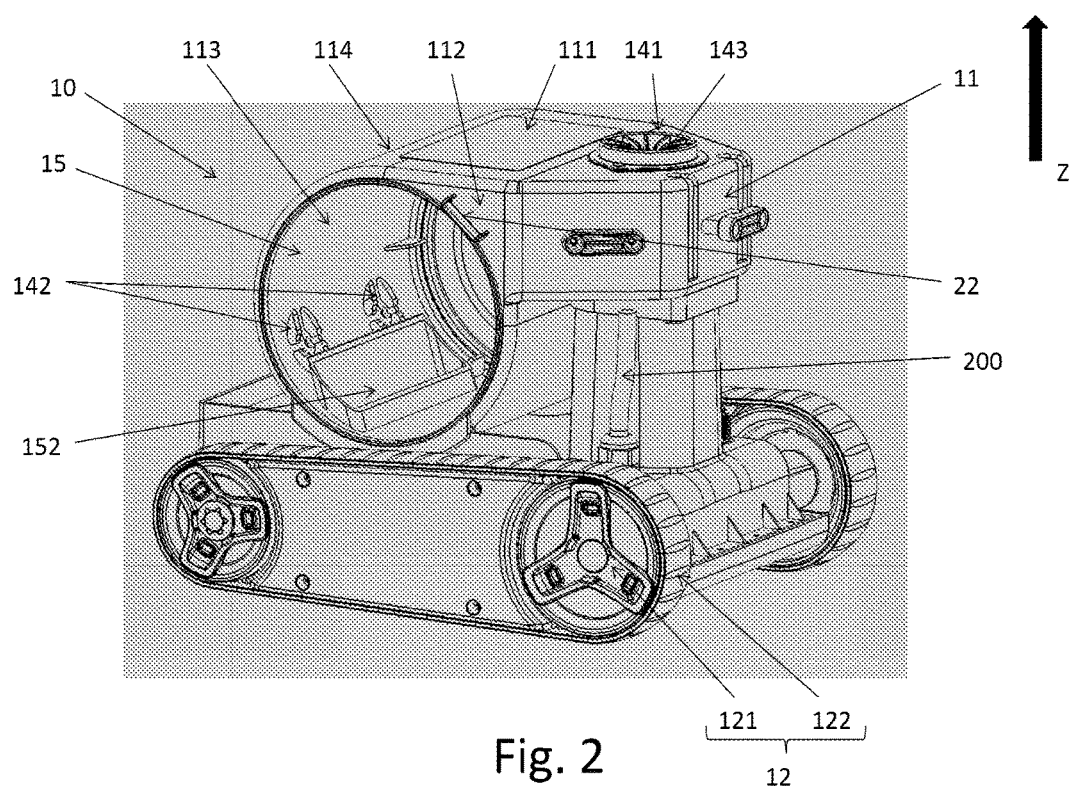
FIG. 2 is a ¾ rear view of one embodiment of a swimming pool cleaning robot.

FIG. 1 and FIG. 2 represent one embodiment of a swimming pool cleaning robot (10) and correspond to ¾ front and rear views, respectively, of said robot (10).

The swimming pool cleaning robot (10) is intended to be supplied with current and controlled by a power supply and control unit (not represented in FIGS. 1 and 2). Said power supply and control unit is positioned outside the swimming pool and includes a power supply electronic circuit card adapted to convert an alternating current coming from the mains electrical power supply into a direct current necessary for the operation of the cleaning robot (10) and a control electronic circuit card adapted to provide automatic management of the movements of the cleaning robot (10) over an immersed surface. In a variant embodiment, the cleaning robot (10) carries said control electronic circuit card, the latter being placed near a motor of said cleaning robot (10), for example.

In one particular embodiment, said power supply card of the power supply and control unit is adapted to convert a 230 volts (V) alternating current voltage from the electrical mains power supply into a direct current voltage less than 30 V.

The swimming pool cleaning robot (10) is supplied with electrical energy by means of a watertight flexible cable (200) connecting the robot (10) to the power supply and control unit.

The swimming pool cleaning robot (10) includes a body (11) and means for moving the body (11) over the immersed surface, said movement means being driven by a motor.

Furthermore, said means for moving the body (11) comprise members (12) for driving and guiding the body (11) over the immersed surface.

In the nonlimiting example shown in FIGS. 1 and 2, the driving and guiding members (12) include four wheels (121) and caterpillar tracks (122) disposed on respective opposite sides of the body (11). To be more specific, said wheels (121) form two groups of two wheels disposed laterally relative to the body (11). The rotation axes of said four wheels (121) are in a single plane and each wheel of one of said two groups is positioned facing a single wheel of the other of said two groups so that they have the same rotation axis. Moreover, the motor driving said driving and guiding members (12) is powered via an onboard electronic circuit card as described above. In other embodiments not described in detail here, there is nothing to prevent using a different number of wheels (121) and other configurations of the driving and guiding members (12).

There is defined for the remainder of the description an axis Z relative to the cleaning robot (10). The direction of said axis Z is a normal to the immersed surface on which the driving and guiding members (12) bear when the robot (10) is operating and is oriented from said immersed surface toward the body (11), it being understood that the upward direction of movement corresponds to the orientation direction of the axis Z. Said axis Z is represented by way of nonlimiting example in FIGS. 1 and 2.

In the remainder of the description, the convention is adopted whereby a normal to the wall of any object is always oriented from the interior toward the exterior of said object.

Moreover, the definition of the parallelism of two straight line segments in three-dimensional space is limited to the situation where there exists a single plane containing said two straight line segments so that said two straight line segments are parallel, in the sense of the usual definition of parallelism in a two-dimensional space, in said plane. By a process of induction, such a restriction also applies to any one-dimensional element that may be regarded as the equivalent of a half-line or a segment.

For the remainder of the description, two axes X and Y are also defined such that:

the axis X is referred to as longitudinal, defined as the axis of movement of the cleaning robot (10) over the immersed surface when the power supply and control unit causes the driving and guiding members (12) to move in the same direction, and oriented in the direction of forward motion, that is to say from right to left here in FIGS. 1 and 2, the axis Y is referred to as transversal and defined so that the three-dimensional frame of reference XYZ is a direct orthogonal frame of reference.

Consequently, the axis Y is parallel to the rotation axis of the wheels. It is then clear that, because of its dependence on the position of the cleaning robot (10) on the immersed surface, said frame of reference XYZ is a mobile frame of reference.

The concepts of front, rear, left, right, high, low, upper, lower, etc. in relation to the cleaning robot (10) are defined relative to the frame of reference XYZ.

Finally, a wall of any object is seen as a continuum of material points. This being the case, there is defined for the remainder of the description the concept of a minimum/maximum coordinate of a wall in any of the directions X, Y or Z, as the minimum/maximum coordinate, in said any one of the directions X, Y or Z, of said material points defining said wall.

The body (11) of the cleaning robot (10) has lower, upper walls (111) and lateral walls configured so that:

said lower wall is intended to be positioned facing the immersed surface over which said robot (10) moves,
said upper wall is opposite said lower wall,
said lateral walls connected said lower and upper walls.

One of the lateral walls of the body (11) is referred to as the "front wall" (114). Said front wall (114) is configured so that none of its normals is parallel to the axis Y and its minimum coordinate in the direction X is greater than the maximum coordinate in the direction X of the lateral walls other than said front wall (114).

Moreover, one of said lateral walls of the robot (10) includes an opening (113) adapted to allow the extraction of a filter basket (151) from the body (11). Said opening (113) has a peripheral edge delimiting its surface, said edge being a closed curve entirely contained within said lateral wall.

Said filter basket (151) is described in more detail hereinafter.

In the nonlimiting example shown in FIGS. 1 and 2, the body (11) has a globally parallelepipedal shape such that the lower and upper walls are orthogonal to the axis Z. The combination formed by the lateral walls comprises a single left-hand lateral wall (112) orthogonal to the axis Y and positioned on the left of the robot (10) when said robot (10) is moving forward. Moreover, the opening (113) is on said lateral wall (112), forming an integral part thereof, and is of circular shape. The body (11) also comprises a front wall (114) of rounded shape configured so that any vector normal to said front wall (114) is contained within a plane orthogonal to the axis Y. In accordance with other embodiments that are not described in detail, there is nothing to prevent the use of other shapes for the opening (113), such as a triangular shape, for example, and for the front wall (114). Moreover, nor is there anything to prevent the opening (113) from which the filter basket (151) can be extracted being on a lateral wall positioned on the right of the cleaning robot (10) when the latter is moving forward.

The body (11) of the swimming pool cleaning robot (10) includes a cleaning brush (13) adapted to clean the immersed surface over which said robot (10) moves. Here "to clean the immersed surface" means to impart motion to the debris encountered by the cleaning robot (10) as it moves over said immersed surface. Said movement is effected in a direction opposite to that of the forward movement of the robot (10), from said immersed surface toward the bottom of the cleaning robot (10), that is to say in the direction of the lower wall of said robot (10) through which the debris is aspirated thereafter.

In the nonlimiting embodiment shown in FIGS. 1 and 2, the convex envelope of the cleaning brush is of cylindrical shape, has its rotation axis coincident with that of the front wheels of the robot (10), and has a width equal to the distance along the axis Y between the front wheels of the robot (10). The cleaning brush (13) comprises a central tube of cylindrical shape and wipers disposed radially and uniformly all along the surface of the tube. The wipers are flexible, of globally parallelepipedal shape, and adapted to rub the immersed surface so that debris is entrained toward the lower wall of the body (11). In other embodiments that are not shown in detail, there is nothing to prevent using other geometries and other positions relative to the body (11) of the cleaning robot (10) for the cleaning brush (13) and the wipers.

The swimming pool cleaning robot (10) includes a filter device adapted to filter debris entering the body (11) via the bottom of said robot (10). To this end, said filter device includes a hydraulic circuit including a plurality of liquid inlets (not shown in FIGS. 1 and 2) and liquid outlets and is adapted to allow the circulation of the liquid from at least one of said liquid inlets to at least one of said liquid outlets.

To be more specific, said liquid inlets are positioned on the upstream side of the hydraulic circuit and pass completely through the lower wall of the body (11). In other words, debris that is as yet unfiltered enters the robot (10) by passing through said liquid inlets.

For their part, said liquid outlets are of different types. First of all, one of said liquid outlets is an upper opening (141) positioned on the downstream side of the hydraulic circuit and passing completely through the upper wall (111). Said upper opening (141) is adapted to evacuate the liquid discharged of its debris by virtue of its circulation within the filter device to the outside of the cleaning robot (10) when operating and in a direction substantially parallel to the axis Z.

In a nonlimiting preferred embodiment shown in FIGS. 1 and 2 the circular opening (141) is positioned on the upper wall (111) at the level of the rear of the robot (10). Moreover, fins (143) are disposed across said opening (141) along all of its circumference. Such a configuration is advantageous in that the fins (143) make it possible to straighten the hydraulic flow in accordance with a purely vertical movement along the axis Z. Accordingly, when the cleaning robot (10) is operating, clean water, that is to say water that has been filtered in the filter device, is aspirated by means of a motor described hereinafter toward said opening (141), the function of the fins (143) being to straighten the flow of this clean water along the axis Z. In a secondary way, said fins (143) also prevent, on the one hand, the entry of objects via the opening (141) in the upper wall (111) and, on the other hand, the introduction of the hands of a user into the hydraulic circuit, thereby preventing all risk of damage to the filter device or injury to said user.

Moreover, said liquid outlets are also front openings (142) passing completely through the front wall of the robot (10) and adapted to evacuate clean water contained in the body (11) when the robot (10) is no longer operating and is extracted from the swimming pool by a user.

In the nonlimiting example shown in FIGS. 1 and 2, the hydraulic circuit includes two circular front openings (142), each of said front openings (142) having a surface uniformly divided into four smaller openings. In accordance with other embodiments that are not described in detail, there is nothing to prevent the use of other shapes and other configurations for the front openings (142).

In the remainder of the description, unless otherwise indicated, the nonlimiting situation is that of the swimming pool cleaning robot (10) having, when operating, a single liquid inlet at the level of its lower wall and a single liquid outlet (141) at the level of its upper wall (111).

The body (11) of the swimming pool cleaning robot (10) also includes a motor and a screw, the assembly formed by said motor and said screw constituting a pump adapted to aspirate and to impart movement to the liquid in the hydraulic circuit of the filter device. Said pump is positioned at the downstream end of the filter circuit, between the filter basket (151) and the liquid outlet (141), in the high portion of the body (11) of the robot (10). To be more specific, said motor is adapted to drive the screw in rotation so that, on the one hand, debris directed toward the underside of the cleaning robot (10) thanks to the cleaning brush (13) is aspirated through the liquid inlet into the body (11) and, on the other hand, filtered liquid, that is to say liquid minus its debris, is expelled to the outside of the robot (10) through the opening (141).

The body (11) also includes valves (115) positioned, from the outside of the robot (10), on the front wall (114) of said body (11), at a low position on said wall (114). Moreover, each of said valves (115) faces a single front opening (142) so that when the valves (115) are pressed against the front wall (114) they entirely cover said openings (142), thereby preventing the exit of the filtered liquid contained in the body (11).

To be more specific, the screw of the pump is adapted, when rotating, to create a reduced pressure flow at the level of the front wall (114) so that the valves (115) are aspirated and pressed toward said front wall (114), therefore coming to block the front openings (142) that they face. In this way, when the robot (10) is operating, the filtered and therefore clean liquid that is contained in the body (11) is not able to escape via said front openings (142) and its only exit is the opening (141). It is therefore clear that the valves (115) are positioned so as to be in contact only with the filtered liquid.

Alternately, when the robot is not operating, the screw of the pump is stopped, and so the valves (115) are free to move and not pressed against the front wall (114) as is the case when the robot (10) is operating. In this way, when a user wishes to extract the robot (10) from the swimming pool by pulling it, preferably from behind (the effect of which is to cause the front of said robot (10) to tilt towards the bottom of the swimming pool), thanks to appropriate holding means fastened to one of the walls of said robot (10), the liquid contained in the body (11), at the level of the front wall (114), exerts a pressure, because of gravity, on the valves (115), which lift off said wall (114), therefore allowing the residual filtered water contained in the robot (10) to escape via the front openings (142). Such a configuration makes it possible to reduce the mass of liquid inside the robot (10) and this therefore facilitates its extraction from the swimming pool.

In the nonlimiting embodiment shown in FIGS. 1 and 2, there are two valves (115) made of rubber. Each valve (115) is positioned facing an opening (142) and includes a disk, said disk being the base of a rod positioned along the rotation axis of said disk. Each of said rods is fastened to each of said disks and passes radially through the front wall (114) at the level of a hole equidistant from the four small openings into which the front opening (142) is divided, and which each valve (115) faces. Moreover, the rod of each valve (115) comprises at the level of its end situated inside the body (11) a shoulder adapted to serve as a bearing surface of said end against the front wall (114) and to prevent withdrawal of said valve (115) from said hole. In this way, each valve (115) is adapted to move radially through the front wall (114), with an amplitude corresponding to the distance between its base and the shoulder on its rod, less the thickness of the front wall (114). In accordance with other embodiments that are not described in detail, there is nothing to exclude using other geometries for the valves (115).

The filter device of the swimming pool cleaning robot (10) comprises a central chamber (15) disposed inside the body (11). Said central chamber (15) crosses the whole of the body (11) of the cleaning robot (10) and includes a transverse wall bearing on two lateral faces. Each lateral face is an integral part of a lateral wall of the body (11), said lateral walls being separate, non-contiguous and different from the front wall (114). One of said lateral faces is virtual, and coincides with the opening (113). The other lateral face, separate from the opening (113), is covered by a closed surface (16) positioned on the left-hand lateral wall (112), that is to say inside the body (11) of the robot (10), and configured so that the liquid in which the robot (10) is immersed cannot enter the body (11) via said closed surface (16).

In the nonlimiting embodiment shown in FIGS. 1 and 2, the central chamber (15) is of substantially cylindrical shape, with its axis of revolution parallel to the axis Y. The transverse wall of the central chamber (15) has for bases two virtual disks disposed face-to-face and forming integral parts of two lateral walls orthogonal to the axis Y. One of said two disks is the base of a porthole in the shape of a spherical dome with the convex shape facing toward the outside of the body (11). Said porthole is said closed surface (16) and is attached by welding, gluing or any other means to the body (11). Furthermore, said porthole is made from a transparent plastic material of PMMA (polymethylmethacrylate) type so that a user of the swimming pool cleaning robot (10) can, by looking inside the body (11) along an axis parallel to the axis Y, visually obtain partial information as to the state of congestion of the filter device.

In the hydraulic circuit, the central chamber (15) is between the liquid inlet and the liquid outlet (141). The central chamber (15) is fed with liquid by means of at least one upstream passage connecting the liquid inlet to said central chamber (15). To be more specific, said upstream passage opens into the central chamber (15) via a feed opening (152), said feed opening (152) being configured so that the liquid that has passed through it is fed directly into the filter basket (151). It is therefore clear that only unfiltered liquid passes through said feed opening, from the upstream passage toward the filter basket (151), the arrangement of said feed opening (152) relative to the filter basket (151) being described in more detail hereinafter.

In one particular embodiment, the hydraulic circuit of the filter device includes a plurality of liquid inlets and a plurality of upstream passages and feed openings adapted to supply the central chamber (15) with liquid.

In the remainder of the description, the nonlimiting situation is that of said central chamber (15) being fed via a single upstream passage.

Figure 3:
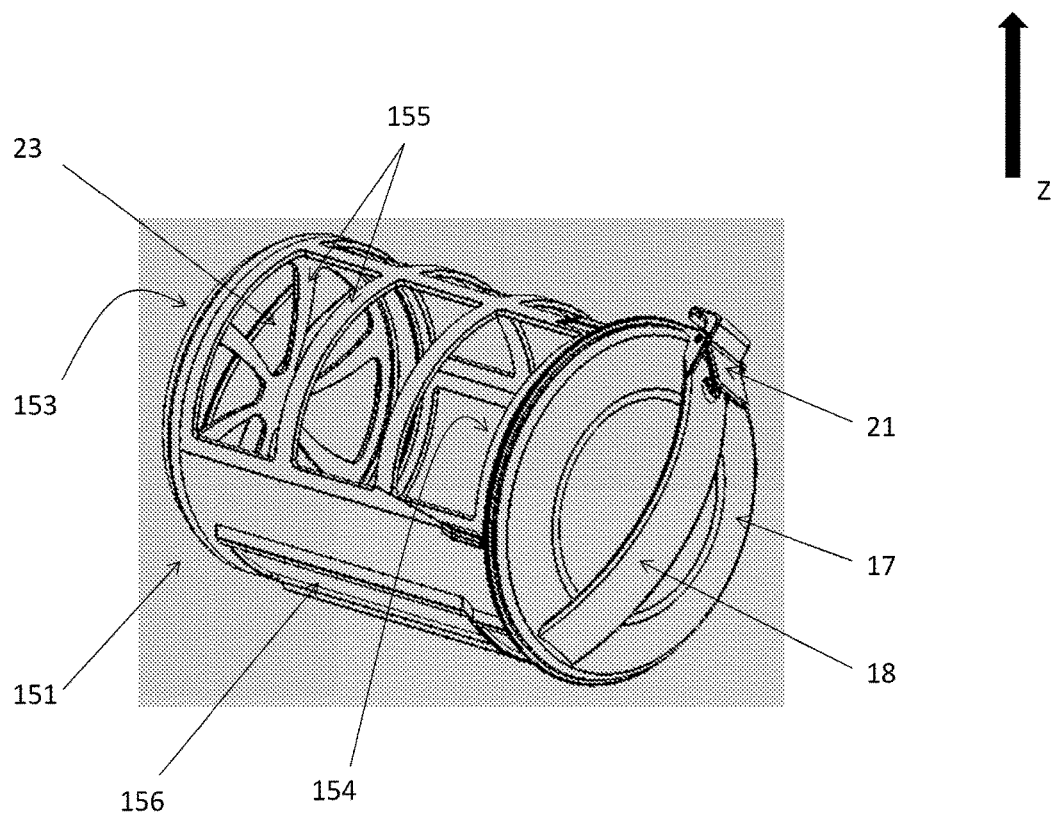
FIG. 3 is a side view of one embodiment of a filter basket suitable for the cleaning robot from FIGS. 1 and 2.

FIG. 3 represents one embodiment of a filter basket (151), said embodiment being suitable for the cleaning robot (10) from FIGS. 1 and 2.

The central chamber (15) contains said filter basket (151), the latter being adapted to filter debris aspirated into the filter circuit via the liquid inlet and fed successively via the upstream passage and the feed opening (152) into said central chamber (15).

To this end, the central chamber (15) is configured so that its internal volume is greater than that of the filter basket (151), the latter being substantially centred inside said central chamber (15). This leaves a residual space between the filter basket (151) and the central chamber (15), said residual space being intended to contain only liquid that has initially passed through said filter basket (151), and is therefore clean liquid. The clean liquid contained in said residual space is intended to be evacuated via the upper opening (141) and the front openings (142) when the robot (10) is respectively operating and stopped.

The filter basket (151) occupies most of the internal volume of the central chamber (15) and globally espouses its shape. Accordingly, said filter basket passes completely through the body (11) of the cleaning robot (10) and includes a transverse wall bearing on two distinct and non-contiguous lateral faces. In particular, one of said two lateral faces, referred to as the "filter lateral face" (153), is situated on the same side of the body (11) as the closed surface (16) of the body (11) of the robot (10) and furthermore directly faces said closed surface (16). The second lateral face (154) is virtual, contained in the opening (113) when the filter basket (151) is inserted in the central chamber (15), and situated facing said filter lateral face (153). Said lateral face (154) has a peripheral edge delimiting its surface.

Said filter basket (151) includes a filter wall, also referred to as the "filter" in the remainder of the description, said filter wall being the junction of said transverse wall of said filter basket (151) and said filter lateral face (153). Said filter wall includes a fine mesh area forming the filter proper and is attached by welding, gluing or any other means to an apertured rigid armature (155).

The size of the mesh of the filter wall is naturally adapted to the size of the particles that the cleaning robot (10) must retain as it moves over the immersed surface.

Moreover, the filter basket (151) includes a check valve (156) integrated into the transverse wall of said filter basket (151) so that when said filter basket (151) is inserted into the central chamber (15) said check valve (156) is positioned facing the feed opening (152). Said check valve (156) is adapted to allow entry of the liquid that has passed successively through the upstream passage and the opening (152) of the central chamber (15), inside the filter basket (151), whilst preventing the escape of said liquid from said filter basket (151).

The filter basket (151) also includes a removable cover (17) hermetically mounted on said filter basket (151) in order to prevent leaking of liquid charged with debris. To this end, said cover (17) includes a peripheral edge adapted to come to cooperate with the peripheral edge of the lateral face (154).

In a variant embodiment, the cover (17) includes a peripheral seal (not shown in the figures) that comes to bear on the edge of the lateral face (154).

In the nonlimiting embodiment shown in FIG. 3, the filter basket (151) is of cylindrical shape with its axis of revolution parallel to the axis Y and coinciding with the axis of revolution of the central chamber (15). The transverse wall of the filter basket (151) has bases in the form of two disks disposed face-to-face and forming integral parts of two lateral walls orthogonal to the axis Y. One of said two disks is said filter lateral face (153) situated directly facing the porthole of the body (11). The second disk is the virtual lateral face (154). Moreover, said lateral face (154) is the base of a porthole having the shape of a spherical dome with the convex shape facing toward the outside of the body (11), said porthole being the cover (17) of the filter basket (151). Said cover (17) is made from a transparent solid material (glass, plastic, etc.) so that a user of the swimming pool cleaning robot (10) can, by looking inside the body (11) along an axis parallel to the axis Y, visually obtain partial information as to the state of congestion of the filter device.

The cover (17) of the filter basket is removable, thus allowing a user access to the content of the filter basket (151) to clean the filter when this proves necessary. To this end, the cover (17) includes holding means (18) for manipulating said cover (17) when it is not cooperating with the filter basket (151) and means for holding it in a fixed position with the filter basket (151).

In the nonlimiting embodiment shown in FIGS. 2 and 3, said holding means (18) of the cover (17) comprise a fixed handle and said means for retaining the cover (17) with the filter basket (151) comprise a projection arranged on a small portion of the peripheral edge of said cover (17). Said projection is adapted to fit into a groove on the transverse wall of the filter basket (151), at the level of the lateral face (154). In this way, when said projection is fitted into said groove, the cover (17) is secured to the filter basket (151). Moreover, the cover (17) is removable from said filter basket (151) by means of a rotation movement enabling said projection to be withdrawn from said groove. Said rotation movement is effected by a user, about the rotation axis of the filter basket (151), using said fixed handle (18), and its amplitude does not exceed a quarter of the total circumference of the peripheral edge of the lateral face (154).

Moreover, in the nonlimiting embodiment shown in FIGS. 2 and 3, the handle (18) of the cover (17) is a strip of transparent plastic having two points of attachment to said cover (17) and configured so that the distance between said handle (18) and the cover (17) enables a user to grasp said handle (18) in their hand. Moreover, said two attachment points are diametrically opposed relative to the lateral face (154) providing the base of the cover (17). In accordance with other embodiments that are not described in detail, there is nothing to exclude the use of other shapes, other configurations and other construction materials for the fixed handle (18).

The filter basket (151) is extractable, that is to say it can be extracted from and introduced into the central chamber (15), the cover (17) coming into continuity with the lateral wall of the body (11) comprising the opening (113). The extraction or introduction of the filter basket (151) when it is secured to the cover (17) is effected thanks to the holding means (18) by a movement in translation. Said movement in translation substantially follows any line joining two points belonging to the faces (153) and (154), respectively.

In the nonlimiting embodiment shown in FIG. 1, the filter basket (151) can be extracted from the central chamber (15) along its axis of revolution, that is to say by a movement in translation parallel to the axis Y. Said movement in translation is initiated by a user pulling on the filter basket (151) by means of the handle (18) of the cover (17), for example.

Moreover, the cover (17) includes means (20) for locking it onto the body (11) of the swimming pool cleaning robot (10). Said locking means (20) are connected to the holding means (18) by return means and are adapted to prevent involuntary extraction of said filter basket (151) when the cover (17) is secured to the filter basket (151) by the retaining means.

In the nonlimiting embodiment shown in FIGS. 1, 2 and 3, said locking means (20) include a latch (21) positioned at one of the ends of the handle (18) of the cover (17) and a notch (22) moulded into the lateral wall (112) of the body (11). In particular, said latch (21) has a curved distal end adapted to be inserted into said notch (22) so as to prevent extraction of the filter basket (151) from the central chamber (15). Furthermore, said return means connecting said latch (21) to the handle (18) comprise a torsion spring. Said torsion spring is configured so that pressing on the proximal end of said latch (21) enables pivoting of said latch (21) about the axis of rotation of said spring. In this way, a user can actuate the latch (21) manually in order to remove its distal end from said notch (22) and thus to unlock and extract the filter basket (151) from the body (11).

In accordance with one particular embodiment, the notch (22) is not moulded into the external surface of the body (11) and consists in a part attached by welding, gluing or other means to the lateral wall including the opening (113).

Said filter basket (151) also includes holding means (23) positioned on the filter lateral face (153) outside the filter basket (151) and enabling manipulation of said filter basket (151) when it is extracted from the central chamber (15).

In the nonlimiting embodiment shown in FIG. 3, said holding means (23) comprise a fixed handle disposed on the portion of the apertured rigid armature (155) of the filter lateral face (153) of the filter basket (151). Said handle (23) comprises two attachment points to said filter lateral face (153) and is configured so that the distance between said handle (23) and said filter lateral face (153) enables a user to grasp said handle (23) in their hand. Furthermore, said two attachment points are diametrically opposed relative to the filter lateral face (153). In accordance with other embodiments that are not described in detail, there is nothing to exclude using other shapes and other configurations for the fixed handle (23).

More generally, it should be noted that the embodiments considered above have been described by way of nonlimiting example and that other variants can therefore be envisaged.

Advantages of the Invention

The use of a central chamber (15) and a filter basket (151), both of cylindrical shape (as shown in FIGS. 1, 2 and 3), and configured so that said filter basket (151) can be extracted from a lateral face of the robot (10), is advantageous in terms of optimizing the filtering of debris. In fact, such a configuration is such that the circulation of the liquid that enters the filter basket (151) via the upstream passage with an upward movement relative to the frame of reference XYZ tied to the robot (10) is cyclonic throughout the cleaning of the swimming pool. In fact, the relative positions of the feed opening (152) and the check valve (156) are such that the liquid enters the filter basket (151) in a direction that follows the shape of the filter. Such a configuration is advantageous because the flow of liquid follows the rounded shape of the filter and optimizes the formation of swirling movements in a region of the filter basket (151) that is far from the edges of said filter basket (151). Such swirling movements make it possible on the one hand to unclog debris that may stick to the filter wall of the filter basket (151) and on the other hand to maintain the debris in suspension far from the filter walls so that the filter cannot become blocked.

Additionally, the filter basket (151) is configured so that it occupies most of the internal volume of the central chamber (15). Such a configuration is advantageous because it makes it possible to limit the loss of space inside the robot (10) so that the liquid as yet unfiltered is fed directly into the filter basket (151) along a straight path, without travelling any distance along the sides of said central chamber (15). In this way, on the one hand, the flow of liquid suffers less head losses compared to what may be observed in a conventional robot and, on the other hand, the robot (10) has less liquid inside it than a conventional robot. This optimizes the weight of the robot (10) which makes it possible to reduce the energy consumption of the cleaning apparatus.

Moreover, the fact that the filter basket (151) can be extracted from a lateral face of the robot (10) and has holding means (18) and (23) makes it possible to empty it easily, notably without having to manipulate the cleaning unit as a whole. To be more precise, the holding means (23) are configured so that the filter basket (151) can be manipulated without having to come into contact with the filter sludge, localized at the level of the filter surface. The user can therefore, after extracting the filter basket (151) from the body (11) using the holding means (18), turn said filter basket (151) over using the holding means (23), empty it, and then wash it in plenty of water without coming into contact with the filter sludge.

Moreover, the cylindrical shape of the filter basket (151) also helps to make possible easy cleaning of the latter. In fact, the absence of corners in the internal volume of the filter basket (151) implies the absence of zones to which access is difficult and which are therefore difficult to clean.

The invention claimed is:

1. A swimming pool cleaning apparatus configured in use to clean an immersed surface, comprising:
   a. a body comprising:

i. a lower wall configured in use to be adjacent to the immersed surface;
　　ii. an upper wall opposite the lower wall;
　　iii. lateral walls connecting the lower and upper walls; and
　　iv. a central interior chamber;
　b. means for moving the body over the immersed surface; and
　c. a filter having at least a portion configured in use to be positioned within the central interior chamber of the body; and wherein at least one of the lateral walls defines an opening through which the filter is extracted from the central interior chamber of the body.

2. A swimming pool cleaning apparatus according to claim 1 in which the filter comprises a basket and a cover hermetically mounted on the basket.

3. A swimming pool cleaning apparatus according to claim 2 in which the cover is removable from the basket.

4. A swimming pool cleaning apparatus according to claim 2 in which the cover comprises first holding means configured to facilitate extraction of the basket from the central interior chamber of the body.

5. A swimming pool cleaning apparatus according to claim 2 further comprising means for locking the cover to the body to prevent involuntary extraction of the basket from the central interior chamber of the body.

6. A swimming pool cleaning apparatus according to claim 2 in which the basket comprises a lateral face facing the cover.

7. A swimming pool cleaning apparatus according to claim 6 in which the lateral face comprises second holding means enabling manipulation of the basket.

8. A swimming pool cleaning apparatus according to claim 2 in which the means for moving the body over the immersed surface comprises members for driving and guiding the body.

9. A swimming pool cleaning apparatus configured in use to clean an immersed surface, comprising:
　a. a body comprising:
　　i. a lower wail configured in use to face the immersed surface;
　　ii. an upper wall opposite the lower wall;
　　iii. lateral walls connecting the lower and upper walls and comprising (A) a front wall; (B) a rear wall opposite the front wall; (C) a left wall connecting the forward and rear walls; and (D) a right wall opposite the left wall; and
　　iv. a central interior chamber;
　b. means for moving the body over the immersed surface in at least a forward direction in which the front wail defines a leading region of the body; and
　c. a filter having at least a portion configured in use to be positioned within the central interior chamber of the body; and wherein at least one of the left or right walls defines an opening through which the filter is extracted from the central interior chamber of the body.

\* \* \* \* \*